(12) United States Patent
Johnson, Jr.

(10) Patent No.: US 7,814,672 B1
(45) Date of Patent: Oct. 19, 2010

(54) FRAMING SQUARE APPARATUS

(76) Inventor: Carl M. Johnson, Jr., 3667 County Road 25, Rayland, OH (US) 43943

( * ) Notice: Subject to any disclaimer, the term of this patent is extended or adjusted under 35 U.S.C. 154(b) by 101 days.

(21) Appl. No.: 12/397,134

(22) Filed: Mar. 3, 2009

(51) Int. Cl.
*B44D 3/38* (2006.01)
*B43L 7/027* (2006.01)
(52) U.S. Cl. .......................................... 33/414; 33/474
(58) Field of Classification Search ................ 33/1 LE, 33/404, 413, 414, 429, 474
See application file for complete search history.

(56) References Cited

U.S. PATENT DOCUMENTS

| | | | |
|---|---|---|---|
| 2,379,791 A | | 4/1943 | Dolgorukov |
| 2,803,062 A | * | 8/1957 | Dutcher .......................... 33/474 |
| 4,095,343 A | * | 6/1978 | McPhail ........................ 33/1 LE |
| 5,107,595 A | * | 4/1992 | Stay et al. ...................... 33/413 |
| D363,679 S | | 10/1995 | Spencer |
| 5,713,135 A | | 2/1998 | Acopulos |
| 6,222,625 B1 | | 4/2001 | Johnston |
| 6,230,416 B1 | | 5/2001 | Trigilio |
| 6,449,855 B1 | | 9/2002 | Louis |
| 2003/0182812 A1 | * | 10/2003 | Tsaur .......................... 33/413 |
| 2009/0013546 A1 | * | 1/2009 | Keller et al. .................. 33/474 |
| 2009/0064513 A1 | * | 3/2009 | Johnson ...................... 33/1 LE |

\* cited by examiner

*Primary Examiner*—G. Bradley Bennett
(74) *Attorney, Agent, or Firm*—Crossley Patent Law; Mark A. Crossley

(57) ABSTRACT

The framing square apparatus provides immediate visual confirmation of a square relationship between two spaced apart surfaces or points. A user need only visually reference the position of the line between squares of the apparatus to determine such. The apparatus is provided with two squares, three squares, or four squares. The number of squares determines the number of points that can be established in square relationship. The line is selectively tied or knotted through the orifice of each square, as desired. The apparatus saves considerable time in determining square between two points, surfaces, corners, or the like. And, using more than two squares provides reference of additional points.

8 Claims, 3 Drawing Sheets

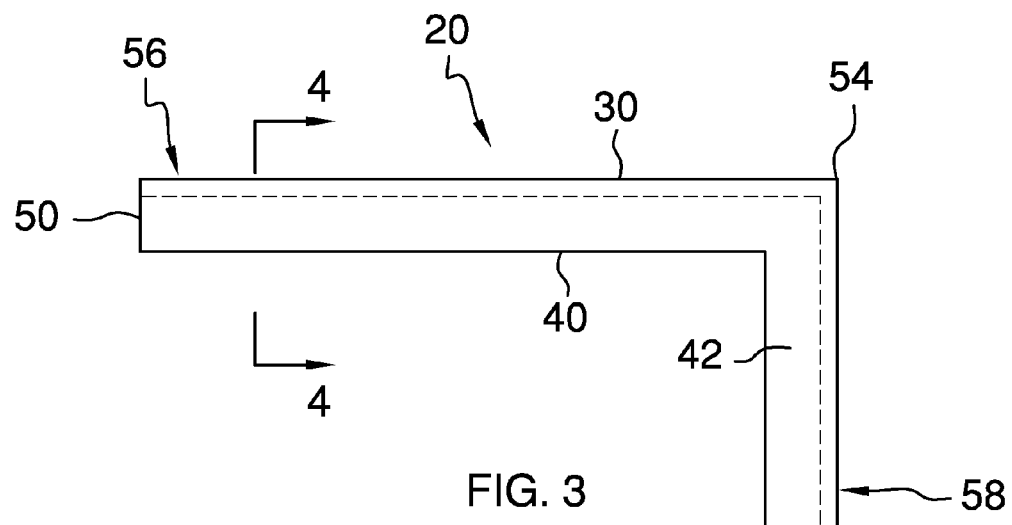
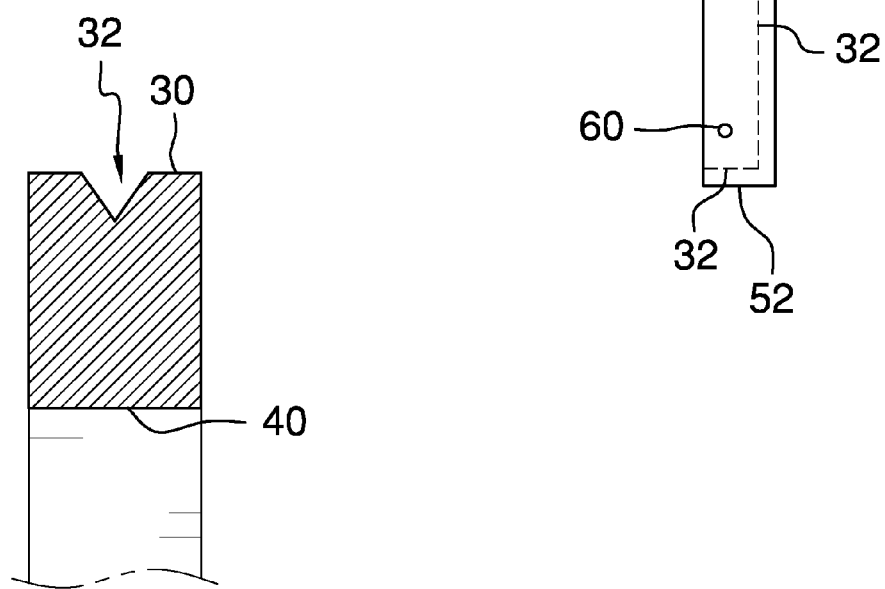

US 7,814,672 B1

FRAMING SQUARE APPARATUS

BACKGROUND OF THE INVENTION

Framing squares have long been used in construction to establish right angles. Recently, framing squares have been modified and improved upon to extend the range of their measuring capacity toward points distant from the square itself. Various forms of framing squares, for example, include lasers that enable as user to project a line from the square. In many forms of construction, there exists a need to establish the square of one corner or point in relation to a distant corner or point, for example. To date, tools for doing so are not as user friendly as is needed. Additionally, many users are hands-on people who sometimes do not want to use a laser or a digital read out gauge of any sort, or to bother with battery life to operate such equipment. Additionally, any electronic equipment must be quite durable in order to withstand typical tool transport and abuse and still function. What has been needed is a basic mechanical means of discerning square construction, one that is reliable, completely durable, and readily dictates square versus un-square. The present apparatus provides for these needs.

FIELD OF THE INVENTION

The framing square apparatus relates to carpentry and measurement tools and more especially to an apparatus that provides at least two squares held in visual relationship by a line, the apparatus quickly visually determining the square of two spaced apart corners.

SUMMARY OF THE INVENTION

The general purpose of the framing square apparatus, described subsequently in greater detail, is to provide a framing square apparatus which has many novel features that result in an improved framing square apparatus which is not anticipated, rendered obvious, suggested, or even implied by prior art, either alone or in combination thereof.

To attain this, the framing square apparatus provides immediate visual confirmation of a square relationship between two spaced apart surfaces or points. A user need only visually reference the position of the line between two squares of the apparatus to determine such. Additionally, the apparatus is provided with two squares, three squares, or four squares. The number of squares determines the number of points that can be established in square relationship. It has been importantly experimentally determined that equal length legs are best, in that visual determination of square is superior to that determined by having one leg shorter than the other, as is common with many framing squares. Additionally, each leg of each square is $1 \frac{7}{8}$ inch wide. The apparatus is $\frac{1}{4}$ inch thick, with a groove that is $\frac{1}{16}$ inch deep. Ideally, the groove is a v-groove for best line retention. The line is selectively tied or knotted through the orifice of each square, as desired. The apparatus saves considerable time in determining square between two points, surfaces, corners, or the like. And, using more than two squares provides reference of additional points. The apparatus does not require batteries. No special care is required of the apparatus, whether in use or transport, as no electronics are present, and therefore little caution required in apparatus treatment.

Thus has been broadly outlined the more important features of the improved framing square apparatus so that the detailed description thereof that follows may be better understood and in order that the present contribution to the art may be better appreciated.

An object of the framing square apparatus is to determine a square relationship between at least two spaced apart corners or surfaces.

Another object of the framing square apparatus is to provide visual determination of square of spaced apart surfaces.

A further object of the framing square apparatus is to provide visual determination of square of spaced apart surfaces without the need of electronics.

An added object of the framing square apparatus is to be subject to transport and rough use without injury to the apparatus.

And, an object of the framing square apparatus is to optionally include a chalk line.

These together with additional objects, features and advantages of the improved framing square apparatus will be readily apparent to those of ordinary skill in the art upon reading the following detailed description of presently preferred, but nonetheless illustrative, embodiments of the improved framing square apparatus when taken in conjunction with the accompanying drawings.

In this respect, before explaining the current embodiments of the improved framing square apparatus in detail, it is to be understood that the framing square apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved framing square apparatus. It is therefore important that the claims be regarded as including such equivalent constructions insofar as they do not depart from the spirit and scope of the framing square apparatus. It is also to be understood that the phraseology and terminology employed herein are for purposes of description and should not be regarded as limiting.

BRIEF DESCRIPTION OF THE DRAWINGS

FIG. 3 is a lateral elevation view of one square of the apparatus, first surface featured.

FIG. 4 is a partial cross sectional view of the square of FIG. 3, taken along the line 4-4.

DETAILED DESCRIPTION OF THE DRAWINGS

With reference now to the drawings, and in particular FIGS. 1 through 5 thereof, the principles and concepts of the framing square apparatus generally designated by the reference number 10 will be described.

Figure 1:
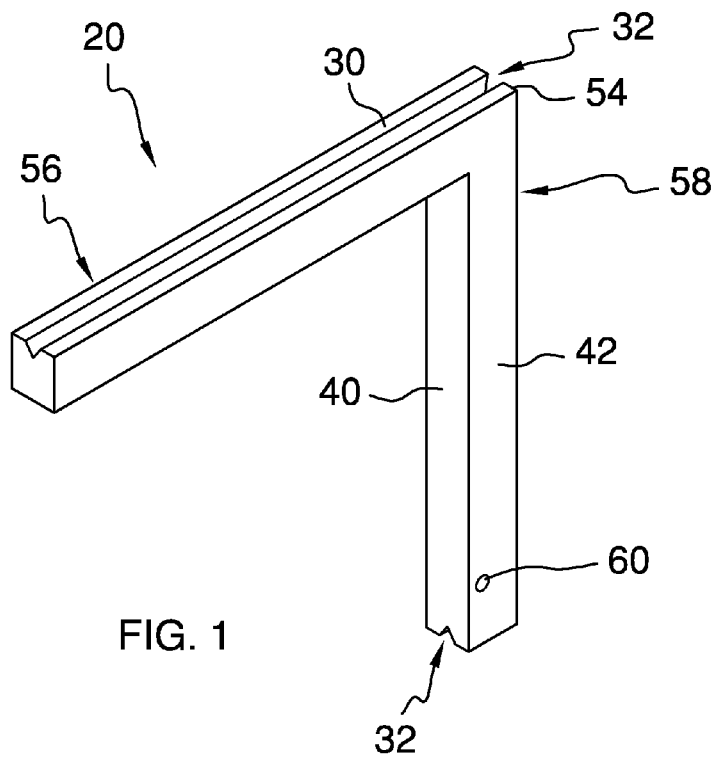
FIG. 1 is a first surface perspective view of one square of the apparatus.
Figure 2:
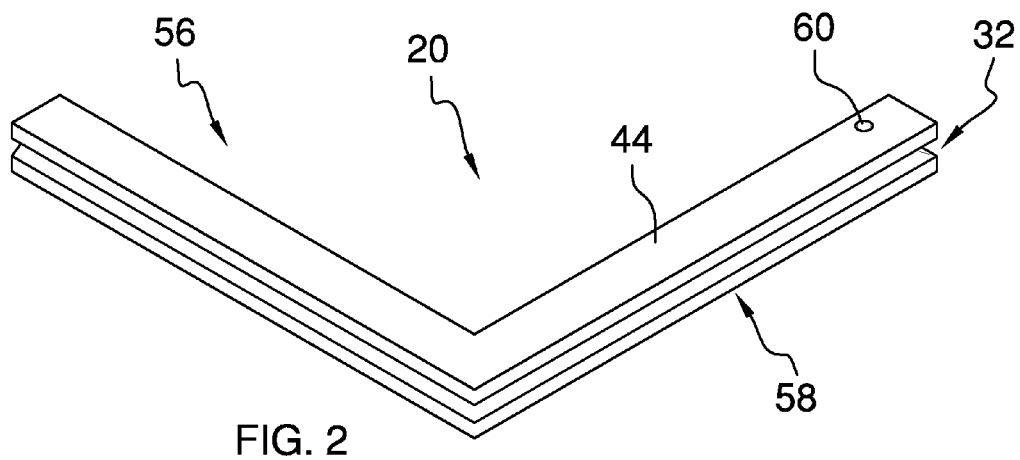
FIG. 2 is a second surface perspective view of one square of the apparatus.

Referring to FIGS. 1, 2, and 3, the framing square apparatus 10 partially comprises at least two identical squares 20. The apparatus 10 is also provided in a 3 square 20 embodiment and in a 4 square 20 embodiment. Each square 20 comprises a pair of perpendicular legs comprising a first leg 56 connected to a second leg 58 by a right-angle corner 54. Each leg comprises a length of 24 inches. Each leg has a width of about $1 \frac{7}{8}$ inch, a feature importantly determined as optimal. Each square 20 comprises a first surface 42 spaced apart from a second surface 44. The inner edge 40 is spaced apart from the outer edge 30. The first end 50 of the first leg 56 is spaced apart from the second end 52 of the second leg 58. The thickness of the apparatus 10 is about ¼ inch. An orifice 60 is disposed in the second leg 58. The orifice 60 is proximal to the second end 52 of the second leg 58.

Referring also to FIG. 4, a continuous groove 32 is disposed within a center of the outer edge 30. The groove 32 is importantly experimentally determined to be a v-groove 32 about 1/16 inch deep. The groove 32 is extended around the second end 52.

Figure 5:
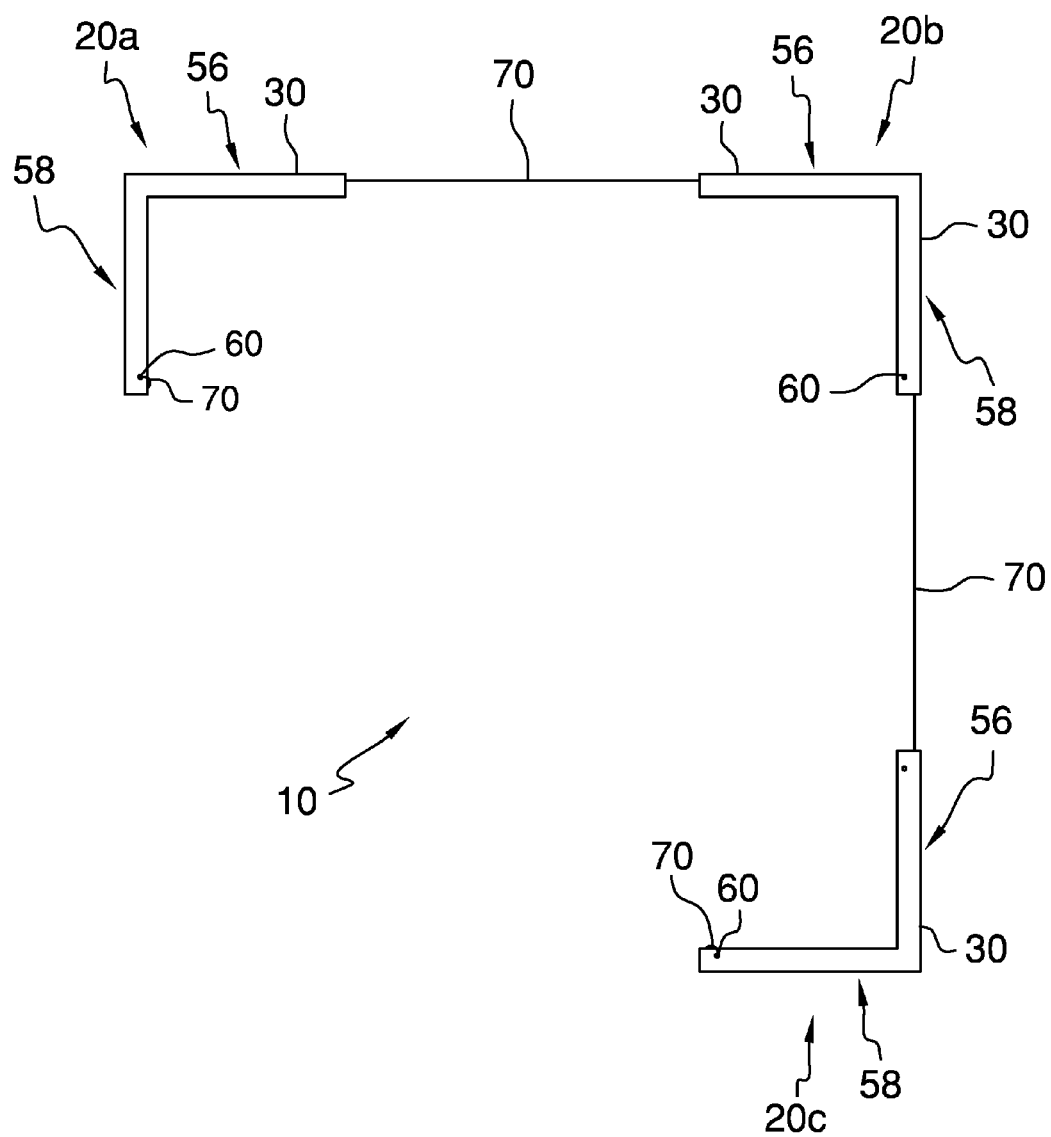
FIG. 5 is a lateral elevation view of the apparatus assembled and illustrating a square relationship between three squares.

Referring to FIG. 5, the 3 square 20 embodiment of the apparatus 10 has the line 70 selectively tied to the orifice 60 of each of the squares 20a and 20c. The 3 squares 20 of FIG. 5 illustrate a square relationship between the squares 20. The line 70 is straight between the first leg 56 outer edge 30 of the first square 20a and the first leg 56 outer edge 30 of the second square 20b. Were the squares 20a and 20b not squarely positioned, the line 70 would be readily visible as above an outer edge 30 of one of the squares 20 or angled downwardly from an outer edge 30 of one of the squares 20. The second square 20b is squarely positioned relative to the third square 20c by virtue of the line 70 being straight between the outer edge 30 of the second leg 58 of the second square 20b and the outer edge 30 of the first leg 56 of the third square 20c.

Referring again to FIGS. 3 and 5, the continuation of the groove 32 around the second end 52 of each square 20 enables the line 70 to be channeled correctly within the grooves 32 and not disposed toward inadvertent displacement. The line 70 is optionally a chalk line 70 so that snapping the line on a given work surface can leave a mark for worker accuracy and convenience.

With respect to the above description then, it is to be realized that the optimum dimensional relationships for the parts of the framing square apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the framing square apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the framing square apparatus may be used.

Therefore, the foregoing is considered as illustrative only of the principles of the framing square apparatus. Further, since numerous modifications and changes will readily occur to those skilled in the art, it is not desired to limit the framing square apparatus to the exact construction and operation shown and described, and accordingly, all suitable modifications and equivalents may be resorted to, falling within the scope of the framing square apparatus.

What is claimed is:

1. A framing square apparatus, comprising, in combination:

at least two identical squares, each square comprising:
a first leg connected to a second leg by a right-angle corner, each square comprising a first surface spaced apart from a second surface, an inner edge spaced apart from an outer edge, a first end of the first leg spaced apart from a second end of the second leg, a thickness of about ¼ inch;
an orifice in the second leg, the orifice proximal to the second end;
a continuous groove within a center of the outer edge;
a line selectively tied to the orifice of each square.

2. The apparatus according to claim 1 wherein the first leg is further 24 inches long from the corner outer edge to the first end of the first leg;
the second leg 24 inches long from the corner outer edge to the second end of the second leg.

3. The apparatus according to claim 1 wherein the line is further a chalk line.

4. The apparatus according to claim 2 wherein the line is further a chalk line.

5. A framing square apparatus, comprising, in combination:

at least two identical squares, each square comprising:
a first leg connected to a second leg by a right-angle corner, each leg comprising a length of 24 inches, each leg having a width of about 1⅞ inch, each square comprising a first surface spaced apart from a second surface, an inner edge spaced apart from an outer edge, a first end of the first leg spaced apart from a second end of the second leg, a thickness of about ¼ inch;
an orifice in the second leg, the orifice proximal to the second end;
a continuous groove within a center of the outer edge, the groove about 1/16 inches deep;
a line selectively tied to the orifice of each square.

6. The apparatus according to claim 2 wherein the line is further a chalk line.

7. A framing square apparatus, comprising, in combination:

at least two identical squares, each square comprising:
a first leg connected to a second leg by a right-angle corner, each leg comprising a length of 24 inches, each leg having a width of about 1⅞ inch, each square comprising a first surface spaced apart from a second surface, an inner edge spaced apart from an outer edge, a first end in the first leg spaced apart from a second end in the second leg, a thickness of about ¼ inch;
an orifice in the second leg, the orifice proximal to the second end;
a continuous groove within a center of the outer edge, the groove about 1/16 inches deep, the groove extended around the second end;
a line selectively tied to the orifice of each square.

8. The apparatus according to claim 7 wherein the line is further a chalk line.

* * * * *